| United States Patent [19] | [11] Patent Number: 5,049,996 |
|---|---|
| Kaneko et al. | [45] Date of Patent: Sep. 17, 1991 |

[54] STILL-VIDEO CAMERA FOR INHIBITING READ-OUT OF A VIDEO SIGNAL WHEN THE SHUTTER IS OPEN

[75] Inventors: Kiyotaka Kaneko; Izumi Miyake, both of Tokyo; Kazutsugu Ogata, Omiya; Kazuhisa Seki, Omyia; Kouji Kaneko, Omiya; Satoshi Mikajiri, Omiya, all of Japan

[73] Assignee: Fuji Photo Film Co., Ltd., Kanagawa, Japan

[21] Appl. No.: 406,547

[22] Filed: Sep. 13, 1989

[30] Foreign Application Priority Data

Sep. 16, 1988 [JP] Japan .................. 63-229890

[51] Int. Cl.⁵ .................. H04N 3/14; H04N 5/335; H04N 5/225
[52] U.S. Cl. .................. 358/213.13; 358/909
[58] Field of Search ............. 358/209, 213.13, 213.24, 358/906, 909, 213.19

[56] References Cited

U.S. PATENT DOCUMENTS

| 4,599,657 | 5/1986 | Kinoshita et al. | 358/213.13 |
| 4,647,976 | 3/1987 | Nakagaki et al. | 358/213.13 |
| 4,675,747 | 6/1987 | Hanma et al. | 358/909 |
| 4,901,154 | 2/1990 | Suga et al. | 358/909 |

Primary Examiner—James J. Groody
Assistant Examiner—Wendy R. Greening

[57] ABSTRACT

In a still-video camera, a video signal representing the image of a photographed subject is written in a video floppy during one revolution of the floppy, namely during an interval between one phase pulse PG and the next. Immediately after the phase pulse PG is generated, a field-shift pulse FS for reading the video signal out of an electronic image pick-up device is outputted. Read-out from the electronic image pick-up device by the field-shift pulse FS is inhibited during the time that a shutter is open. Writing is carried out from the moment of the next phase pulse PG after read-inhibit is cancelled. If the inhibition on read-out from the electronic image pick-up device were to be cancelled between the phase pulse PG and the field-shift pulse FS, read-out of the video signal by the field-shift pulse FS would be carried out, but it would not be possible to carry out recording without waiting for the next phase pulse PG. By providing reading and writing at timings as described above, it is possible to carry out recording without waiting for the next phase pulse PG.

6 Claims, 4 Drawing Sheets

Fig. 3
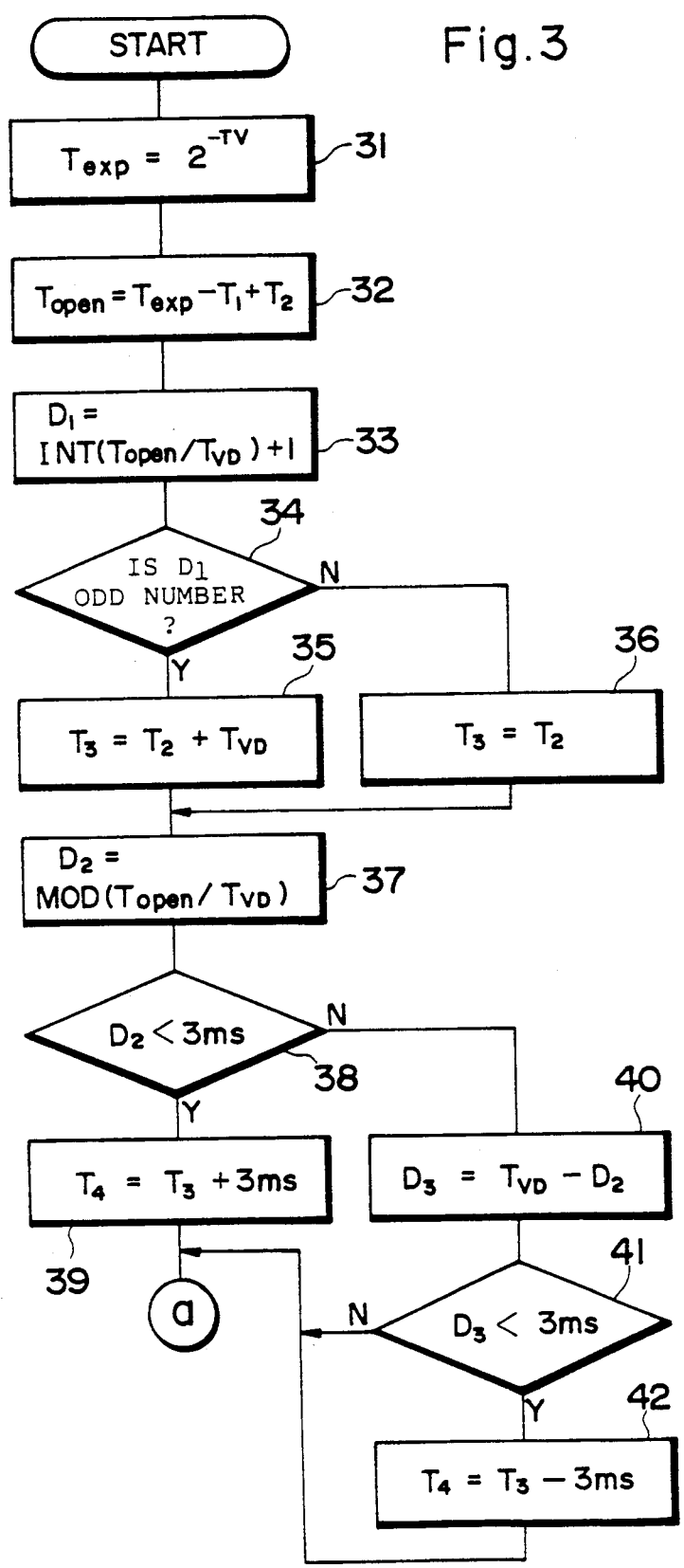
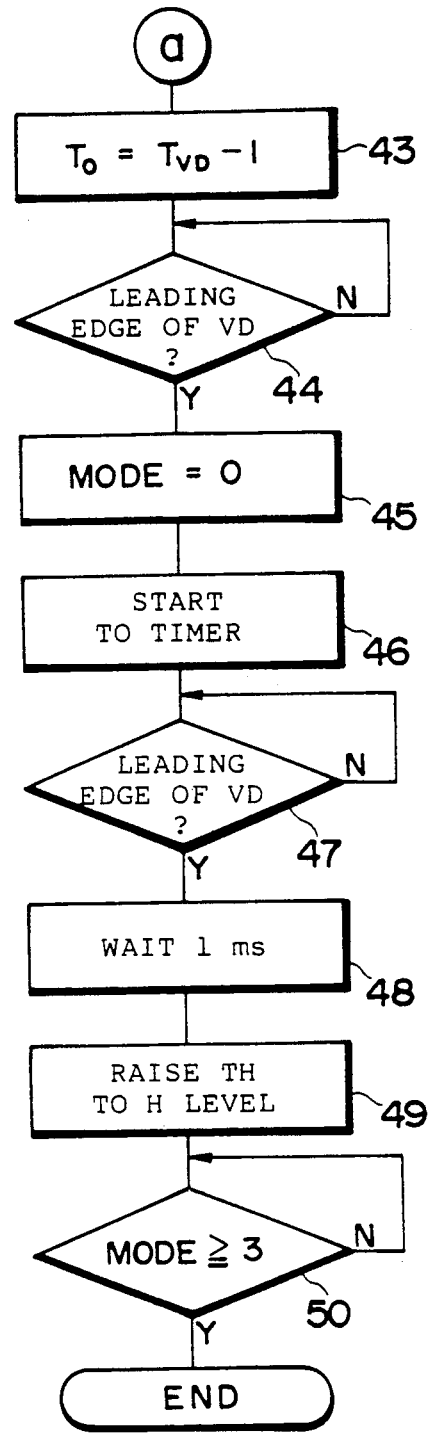

STILL-VIDEO CAMERA FOR INHIBITING READ-OUT OF A VIDEO SIGNAL WHEN THE SHUTTER IS OPEN

BACKGROUND OF THE INVENTION

1. Field of the Invention

This invention relates to a still-video camera (also referred to as an electronic still camera) capable of photography using a shutter.

2. Description of the Related Art

By making use of a shutter in a still-video camera, it is possible to control the storage time of an electric charge in an electronic image pick-up device. Since storage of electric charge in an image pick-up device is carried out while the shutter is open, read-out from the pick-up device is inhibited during this time. When the shutter is closed, the electric charge is read out of the image pick-up device at a predetermined timing and the read still-video signal is recorded on a video floppy (magnetic disk).

Conventionally, read-out is inhibited using a shutter control signal. That is, the control signal is such that a leading blind of the shutter is released and made to travel at the leading edge of the signal and a trailing blind is released and made to travel at the trailing edge of the signal. In the conventional image pick-up devices, read-inhibit is cancelled at the trailing edge of the control signal. However, a problem which arises is that since the shutter is still not fully closed at the trailing edge of the control signal, non-uniform exposure develops on the recorded frame of the video signal when the signal is read out of the image pick-up device.

Accordingly, it is preferred that read-out from the image pick-up device be inhibited until the shutter is completely closed. Full closure of the shutter can be sensed by a sensor or by clocking elapsed time from the moment the latch of the trailing blind is released. Therefore, cancellation of read-inhibit after the shutter is completely closed is capable of being realized with comparative ease.

An important problem which must be considered in determining the moment at which read-inhibit is cancelled is the fact that there is a phase difference between a phase pulse PG which decides the start of write-in to the video floppy and a field-shift pulse FS which controls the read-out of the video signal from the image pick-up device. As is well known, the phase pulse PG is generated at every revolution of a video floppy. In a still-video camera, the video signal, which represents the subject photographed, is written in the video floppy during one revolution of the video floppy, namely between one phase pulse PG and the next phase pulse PG. The rotation of the video floppy is controlled in such a manner that the phase pulse PG will be generated at a position which is 7H±2H ahead of a vertical synchronizing signal, and the field-shift pulse FS is outputted with a constant phase delay with respect to the vertical synchronizing signal.

As mentioned above, read-out from the image pick-up device by the field-shift pulse FS is inhibited while the shutter is open. In addition, write-in to the video floppy is performed from the moment of the next phase pulse PG following cancellation of read-inhibit. If the inhibition on read-out from the electronic image pick-up device were to be cancelled between the phase pulse PG and the field-shift pulse FS, read-out of the video signal from the pick-up device by the field-shift pulse FS would be carried out, but it would not be possible to carry out recording without waiting for the next phase pulse PG. In other words, most of the read video signal would not be written in the video floppy.

SUMMARY OF THE INVENTION

An object of the present invention is to provide a still-video camera controlled in such a manner that a video signal representing a photographed subject is read out of an image pick-up device correctly and written in a recording medium appropriately at all times.

According to the present invention, the foregoing object is attained by providing a still-video camera comprising an electronic image pick-up device for picking up an image of a subject, a shutter for controlling incidence of the image of the subject upon the electronic image pick-up device, means for generating a field-shift signal, which controls read-out of a video signal from the electronic image pick-up device, slightly later than a synchronizing signal related to the start of recording of the video signal, inhibiting means for inhibiting read-out by the field-shift signal while the shutter is open; and means for controlling the inhibiting means in such a manner that inhibiting of read-out by the inhibiting means will not be cancelled in an interval from the synchronizing signal to generation of the field-shift signal.

In accordance with the invention, read-out of the video signal from the electronic image pick-up device by the field-shift signal (field-shift pulse FS) is inhibited during the time that the shutter is open. However, in a case where cancellation of read-inhibit is carried out in an interval from the synchronizing signal (phase pulse PG) to generation of the field-shift signal because of a relationship involving the shutter-open time (shutter speed), cancellation of read-inhibit is forcibly set to take place before output of the synchronizing signal or after generation of the field-shift signal, and control is so exercised that read-inhibit performed by the inhibiting means will not be cancelled in the aforementioned interval. Accordingly, the above-described inconveniences do not arise and timing for read-out of the video signal from the electronic image pick-up device and timing for recording of the video signal can be set appropriately at all times.

Further scope of applicability of the present invention will become apparent from the detailed description given thereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 3 is a flowchart illustrating the procedure of the processing of FIG. 2.

DESCRIPTION OF THE PREFERRED EMBODIMENTS

Figure 1:
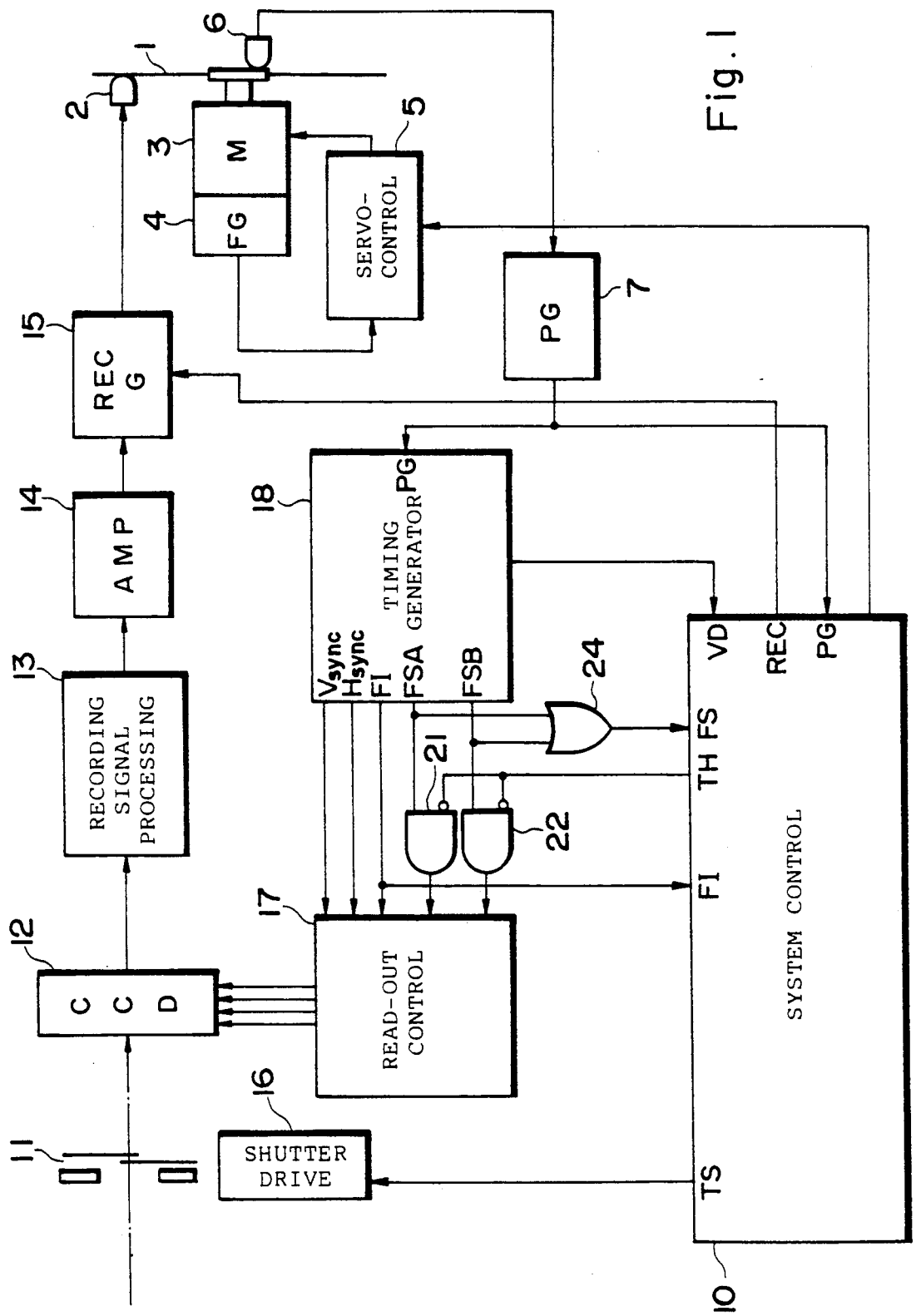
FIG. 1 is a block diagram illustrating an embodiment of the invention for the electrical construction of part of a still-video camera.
Figure 2:
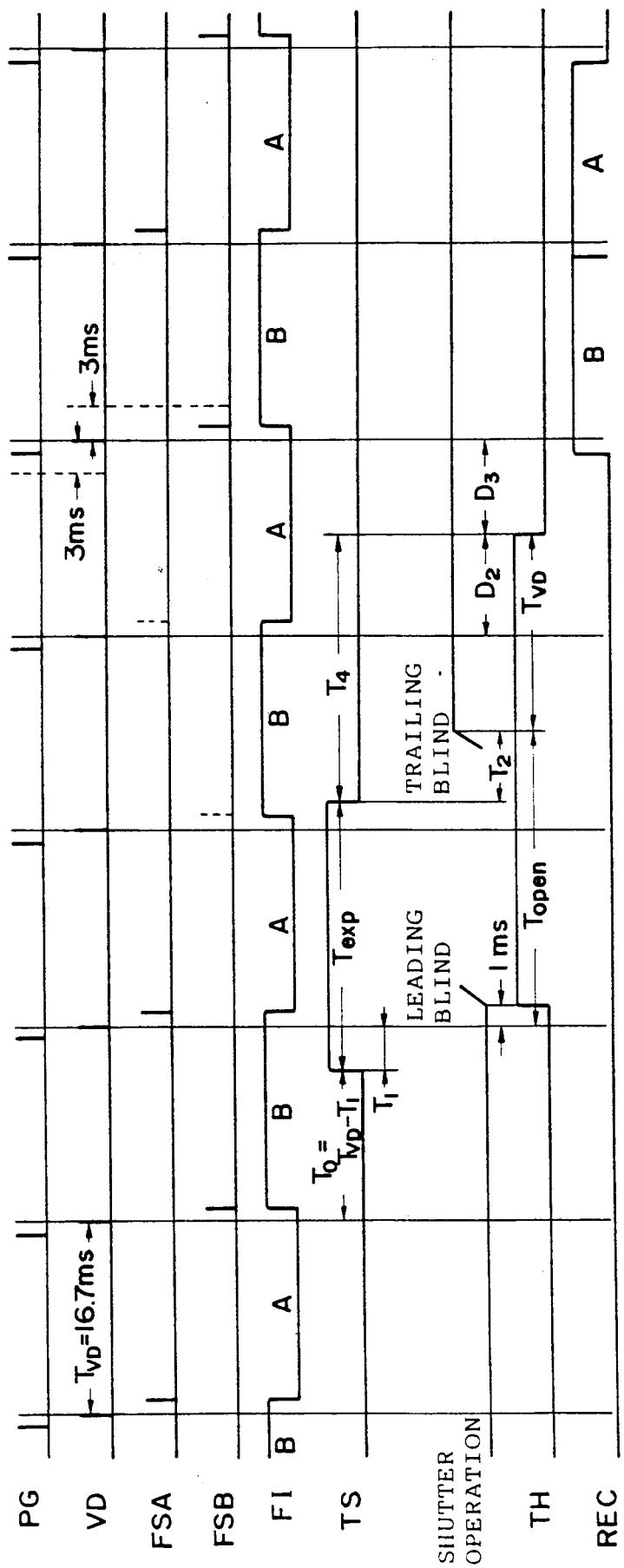
FIG. 2 is a time chart illustrating the operation of field-shift inhibit processing in the electric circuit of FIG. 1.

FIG. 1 is a block diagram illustrating the electrical construction of a still-video camera necessary for describing an embodiment of the present invention, and FIG. 2 is a time chart showing the signals associated with the circuit of FIG. 1. The still-video camera of this embodiment is capable of frame recording, and the time chart of FIG. 2 illustrates operation at the time of frame recording. Of course, the present embodiment is applicable also to still-video cameras capable solely of field recording.

The overall operation of the still-video camera is under the control of a system control unit 10 including such components as a CPU, a memory and the required interface circuitry.

A video floppy 1 serving as a magnetic recording medium is provided with a plurality (e.g. 50) of circular, concentrically disposed tracks having a track pitch of e.g. 100 μm. Magnetically recorded on one or two tracks by imaging processing is one field or one frame of a frequency-modulated color still video signal (inclusive of luminance and chrominance signals, etc.). The 50 tracks concentrically provided on the magnetic recording surface of the magnetic disk 1 are numbered consecutively from No. 1 to No. 50 starting from the outer side of the disk.

A disk motor 3 for rotatively driving the video floppy 1 is controlled by a servo-control circuit 5. More specifically, the rotational speed (rpm) of the disk motor 3 is detected by a frequency generator 4, which outputs a detection signal having a frequency proportional to the rotational speed of the motor 3. This signal enters the servo-control circuit 5. Based on a reference clock signal having a fixed frequency and the frequency detection signal which enters from the generator 4, the servo-control circuit 5 controls the motor 3 so that the motor 3 will rotate at a fixed rotational speed (e.g., 3600 rpm). The servo-control circuit 5 functions also to start and stop the motor 3 in dependence upon a command from the system control unit 10.

A magnetic head 2 (two of which are provided in spaced relation at mutually adjacent tracks so as to make frame recording possible) for the purpose of writing still-video signals of an imaged subject on predetermined tracks of the video floppy 1 is supported so as to be freely movable radially of the video floppy 1, and has its feed controlled in the same direction, by a transfer drive control device, not shown. The latter includes a stepping moptor and a driver for the stepping motor. The system control unit 10 provides the transfer drive control device with instructions regarding the direction and amount of feed of the magnetic head 2.

Disposed near the core of the video floppy 1 is a phase detector 6 for detecting leakage flux from a chucking permanent magnet and outputting a phase detection signal when the video floppy 1 arrives at a predetermined angular position. The output signal of the phase detector 6 has its waveform shaped by a phase pulse generator circuit (waveshaper circuit) 7, the output of which is a phase pulse PG fed into the system control unit 10 and a timing generator circuit 18. One phase pulse PG is generated every revolution of the video floppy 1. When the video floppy 1 is rotating at a steady speed (3600 rpm), the period of the phase pulse PG is 1/60 sec (16.7 ms), which corresponds to 1V (one vertical scanning interval).

The imaging optical system includes an imaging lens system (not shown) for imaging a subject, a diaphragm (not shown) and a shutter 11. Latch release of leading and trailing blinds of the shutter 11 as well as blind wind-up is executed by a shutter drive unit 16, which includes a shutter motor. The shutter drive unit 16 is controlled by the system control unit 10. More specifically, the system control unit 10 applies a shutter control signal TS to the shutter drive unit 16. The control signal TS is outputted at a predetermined timing, described below, following depression of a shutter-release button (not shown), and attains an H level during an exposure time $T_{exp}$. The shutter drive unit 16 releases the latch of the leading blind at the leading edge of the control signal TS, causes the leading blind to travel (start of the leading blind), releases the latch of the trailing blind at the trailing edge of the signal TS and then causes this blind to travel (start of the trailing blind).

A solid-state electronic image pick-up device 12 for the three primary colors including a two-dimensional imaging cell array, such as a CCD, is disposed in the focal plane of the imaging optical system. The image pick-up device 12 is capable of having a stored charge of one frame and two fields read out by interlaced scanning. One example is an interline transfer-type image pick-up device. The dark current of the image pick-up device or image data accumulated while the shutter 11 is open is read out as a serial video signal under the control of a read control circuit 17 using various timing signals generated by the timing generator circuit 18.

The timing generator circuit 18 generates a vertical reference signal VD synchronized to the input phase pulse PG but lagging slightly behind the pulse PG. The reference signal VD is applied to the system control unit 10. The system control unit 10 executes various types of control using the reference signal VD and phase pulse PG as a reference timing. One period of the vertical reference signal VD is equal to 1 V, and this is represented by $T_{VD}$.

The timing generator circuit 18 generates a field-shift signal FSA of a first field (field A) and a field-shift signal FSB of a second field (field B), each of which is lagging slightly behind the vertical reference signal VD and has a period twice the period (equal to $T_{VD}$) of the phase pulse PG, and a field index signal FI which repeats alternatingly at the period $T_{VD}$. The field-shift signals FSA, FSB, which repeat in alternating fashion and are applied to the read control circuit 17 via disable gates 21, 22, described below. The disable gates 21, 22 are controlled by a field-shift inhibit signal TH outputted by the system control unit 10. When the signal TH is at the H level, application of the signals FSA, FSB to the circuit 17 is inhibited. These signals FSA and FSB enter the system control unit 10 as a field-shift signal FS (the signal FS is a generic term for the signals FSA, FSB) via an OR gate 24. The field index signal FI repeatedly changes state between the H and L levels whenever the field shift signals FSA and FSB are generated. When the signal FI is at the L level, this represents reading of field A; when the signal FI is at the H level, this represents reading of field B. The signal FI is applied to the read control circuit 17 and the system control unit 10. It can be so arranged that the signals FSA, FSB and FI are generated by the read control circuit 17 rather than the timing generator circuit.

The timing generator circuit 18 generates a vertical synchronizing signal Vsync and a horizontal synchronizing signal Hsync for reading the image data out of the imaging device 12. These synchronizing signals enter the read control circuit 17.

If the image pick-up device 12 is an interline-type device, accumulated electric charges of the first field at the light-receiving section of the image pick-up device 12 are transferred instantaneously to the adjacent vertical transfer CCDs by the field-shift signal FSA (transfer pulse) applied to the read control circuit 17, after which transfer from the vertical transfer CCDs to a horizontal transfer CCD and output of the serial video signal from the horizontal transfer CCD are carried out in synchronization with the horizontal synchronizing signal and a clock pulse (a pulse for reading out each pixel), respectively, over an interval of 1 V. When the field-shift signal FSB is applied, the stored charges of the second field at the light-receiving section are transferred to the vertical transfer CCDs, after which the read-out operation is performed in the same manner.

The serial still-video signal (R,G, and B) read out of the imaging device 12 enters a recording signal processing circuit 13. The latter has a preamplifier circuit to which the still-video signal (R,G and B) is applied, a variable gain amplifier circuit (white balance adjustment circuit), a process matrix circuit, frequency modulator circuits and a mixer circuit. A luminance signal Y and two color difference signals R-Y and B-Y are formed in the process matrix circuit. These color difference signals R-Y and B-Y are then line-sequenced every 1H by a line sequencer circuit. The luminance signal Y and the line-sequenced color difference signals are applied, via a preemphasis circuit (not shown), to two frequency modulator circuits where the signals are frequency-modulated at different frequency bands before being combined by a mixer circuit.

The resulting synthesized frequency-modulated still-video signal enters a recording gate circuit 15 after being amplified by a recording amplifier circuit 14. The recording gate circuit 15 opens when the recording signal REC outputted by the system control unit 10 at a predetermined timing, described below, attains the H level. In the case of frame recording, the recording signal REC attains the H level for two consecutive periods of the phase pulses PG. In the first of these periods, the frequency-modulated still-video signal of field A or field B is applied to one of the two magnetic heads 2; in the second of the periods, the frequency-modulated still-video signal of field B or field A is applied to the other of the two magnetic heads 2. In this way recording is performed one track and one field at a time over two tracks of the video floppy 1.

Since storage of the signal charge, which represents the image of the subject, in the image pick-up device 12 is carried out while the shutter 11 is open, read-out from the image pick-up device 12 is inhibited at this time. In other words, during the time that the shutter 11 is open, the disable gates 21 and 22 are closed and application of the field-shift signals FSA and FSB to the read control circuit 17 is inhibited. The time during which the shutter is open refers to a length of time during which the shutter 11 is actually open.

Control is performed in such a manner that cancellation of the aforementioned read-inhibit (namely trailing of the field-shift inhibit signal TH) will not occur in the period from occurrence of the phase pulse PG to the occurrence of the field-shift signal FS. The recording gate 15 is controlled with the phase pulse PG serving as a reference, and the gate opens immediately after read-inhibit is cancelled. More specifically, when inhibiting of read-out from the image pick-up device 12 is cancelled, the interval from the immediately following phase pulse PG to the next phase pulse PG becomes the recording interval of one field of the still-video signal, and the interval from the aforementioned immediately following phase pulse PG to the next phase pulse PG becomes the recording interval of one frame of the still-video signal. Accordingly, if read-inhibit is cancelled in the period from the phase pulse PG to the field-shift signal FS so that the field-shift signal FSA or FSB is applied to the read control circuit 17, then, irrespective of the fact that read-out of the signal charge from the image pick-up device 12 is started by this field-shift signal, recording must wait for the occurrence of the next phase pulse PG, namely for a time of about 1 V.

The reference signal VD is generated lagging slightly behind the phase pulse PG, and the field-shift signal FS is generated lagging slightly behind the reference signal VD. The interval from the phase pulse PG to the field-shift signal FS is about 1.2 ms, though this differs depending upon the image pick-up device 12 used. Accordingly, in this embodiment, the reference signal VD is employed as a reference, a period of 3 ms is set on either side of the signal VD, and control is effected in such a manner that cancellation of read-inhibit will not take place in this period of $3+3=6$ ms.

Figure 4:
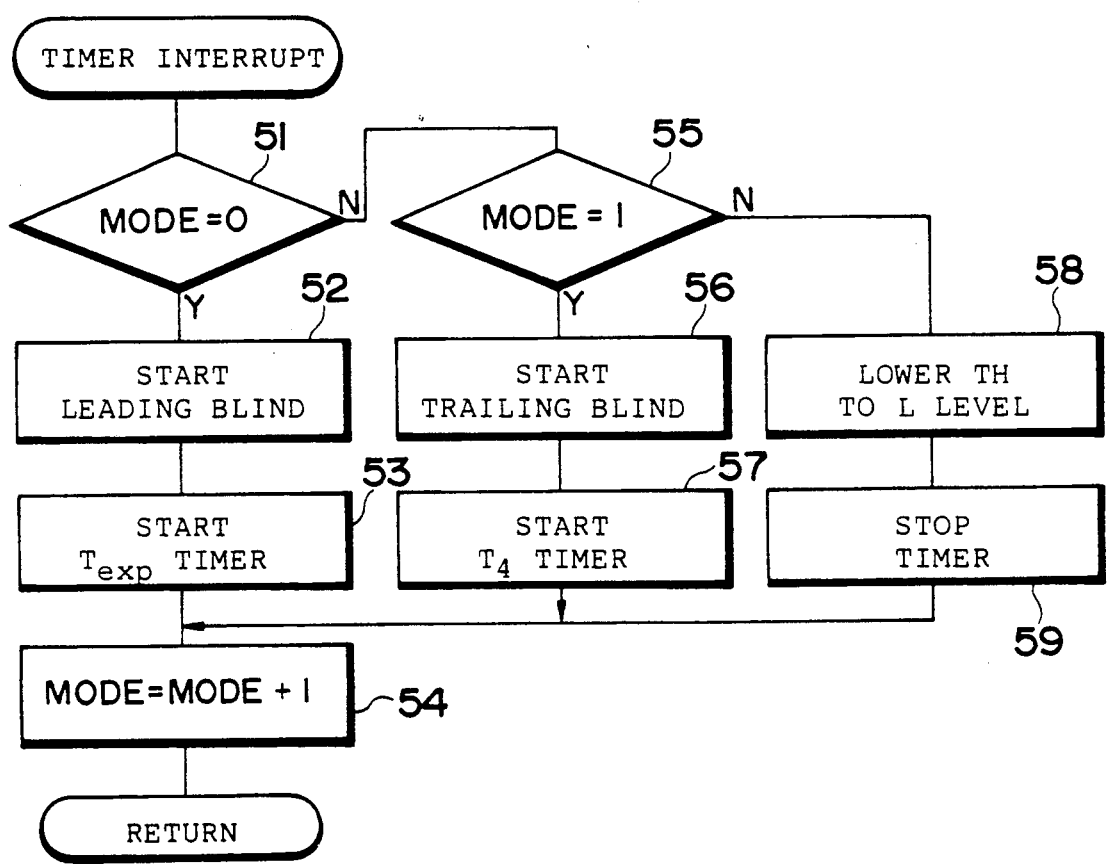
FIG. 4 is a flowchart illustrating a timer-interrupt processing procedure.

Processing for inhibiting the field-shift signal and cancelling the inhibition will now be described with reference to FIGS. 3 and 4 as well as FIGS. 1 and 2. FIG. 3 illustrates main processing executed by the CPU of the system control unit 10, and FIG. 4 illustrates timer-interrupt processing performed when a timer, which is provided within the unit 10, runs out of time. When there is an input from the shutter-release button, the CPU of the system control unit 10 calculates shutter speed (step 31) (exposure time $T_{exp}$) based on the results of measurement of the amount of entrant light performed by a photometric element (not shown). Next, time $T_{open}$ from the reference signal VD immediately following start of exposure (start of the leading blind, namely the leading edge of the shutter control signal TS) to the closure of the trailing blind is obtained in accordance with the equation $T_{open}=T_{exp}-T_1+T_2$ (step 32). Here $T_1$ is the time from start of the leading blind to the occurrence of the reference signal VD, and $T_2$ is the time from start of the trailing blind to full closure of the trailing blind. These times are decided by the characteristics of the shutter.

In this embodiment, the timing at which the shutter is opened is predetermined, with the reference signal VD serving as a reference. That is, the timing at which the leading blind of the shutter is started is determined in such a manner that actual release of the leading blind of the shutter will take place 1 ms after the reference signal VD, and the time $T_1$ is so decided that starting of the leading blind will be carried out at this timing. Accordingly, as will be illustrated later, latch release (start of the leading blind, which takes place at the leading edge of the signal TS) of the leading blind of the shutter is performed when time $T_0=T_{VD}-T_1$ elapses from the occurrence of the reference signal VD ahead by one.

Next, an integer which is a quotient obtained by dividing the calculated time $T_{open}$ by the interval 1 V ($T_{VD}$) is found. This integer is expressed by INT-($T_{open}/T_{VD}$) and is either 0 (in a case where the quotient is less than 1) or a positive integer. A value obtained by adding 1 to this integer is adopted as $D_1$ (step 33). The reason for adding 1 is to prolong the read-inhibit time (the time from the leading to the trailing edge of the signal TH) by 1 V. This is to secure enough time for sweeping out the electric charges of the vertical and horizontal transfer paths of the image pick-up device. The sweep-out of the charge is performed by the read control circuit 17 using a signal different from the field-shift signal. If sweep-out (clearing) of the charges from the vertical and horizontal transfer paths is not performed, there is the danger that flicker will be produced when the image that has been picked up is displayed. However, this problem can be prevented from arising by performing sweep-out during the interval of 1 V.

It is determined whether the value $D_1$ obtained at step 33 is odd or even (step 34). If the value $D_1$ is odd, $T_{VD}$ is added to the aforementioned time $T_2$ in order to further prolong the read-inhibit time by 1 V, and the result of this addition is made $T_3$ (step 35). This is done in order to make the numbers of field-shift pulses FSA and FSB equal. A dark current is constantly being generated in the image pick-up device. In the case of frame recording, read-out from the image pick-up device is performed every field. There is the danger that a video signal for which there is a difference between the level of the dark current in the first field and the level of the dark current in the second field will cause flicker when the video signal is played back on a display device such as a CRT, thus producing an image which is not attractive. Accordingly, the read-inhibit time period during which the dark current is stored is made equal for the first field and second field (field A and field B), thereby making the difference between the dark currents zero or suppressing this difference to a value near zero.

If the value $D_1$ is an even number, the time $T_2$ is made the time $T_3$ (step 36). In the example of FIG. 2, the value $D_1$ is 2; hence, this represents a case where the value is even.

In order to determine whether the moment at which read-inhibit is cancelled (the moment the field-shift inhibit signal TH decays) is within the limits of 3 ms on either side of the reference signal VD, the remainder (fraction) which prevails when the integer (inclusive of 0) is obtained by dividing the time $T_{open}$ obtained at step 32 by $T_{VD}$ is found (step 37). This remainder is made $D_2$ and is represented by MOD($T_{open}/T_{VD}$). It is checked to see whether the value $D_2$ representing this remainder is less than 3 ms (step 38). If is, then it lies within the range of 3 ms immediately following the reference signal VD. Therefore, 3 ms is added to the time $T_3$ obtained by the foregoing processing and the result of this addition is made $T_4$ (step 39). Thus, the read-inhibit time (the trailing edge of the signal TH) is prolonged by 3 ms so that the read-inhibit time will be excluded from the range of 3 ms following the reference signal VD.

If $D_2$ is found to be greater than 3 ms at step 38, the value $D_3$ is evaluated from $D_3 = T_{VD} - D_2$ (step 40) in order to check whether the moment at which the inhibition is cancelled is within the range of 3 ms preceding the reference signal VD. It is then determined whether the value $D_3$ is less than 3 ms (step 41). If the value $D_3$ is less than 3 ms, the result of subtracting 3 ms from the time $T_3$ is made $T_4$ (step 42). As a result, the moment at which the inhibition is cancelled (the trailing edge of the signal TH) is set to occur more than 3 ms before the reference signal VD.

As set forth above, the computation $T_0 = T_{VD} - T_1$ is performed in order to decide the instant at which the leading blind starts (step 43). When the vertical reference signal VD rises (step 44), a mode counter is cleared to 0 (MODE=0; this is a counter for counting the processing steps) (step 45). The time $T_0$ calculated at step 43 is set in a timer and operation of the timer is started (step 46).

When the time $T_0$ elapses from the rising edge of the reference signal VD, the timer runs out of time and a transition is made to the interrupt processing as illustrated in FIG. 4. Since the count recorded in the mode counter will be 0 (step 51), the shutter control signal TS rises and the latch of the leading blind of the shutter is released (step 52). The exposure time $T_{exp}$ is set in a timer and the timer is started (step 53). The mode counter is then incremented to raise its count to 1 (step 54) and the program leaves the interrupt processing routine.

In FIG. 3, the reference signal VD rises again during the clocking operation performed by the counter set to the time $T_{exp}$ (step 47). Therefore, at an elapse of 1 ms from this leading edge (step 48), the field-shift inhibit signal TH rises to the H level and entry of the field-shift signals FSA and FSB to the read control circuit 17 is inhibited (step 49). The field-shift signal (FSA in FIG. 2) is applied in the 1 ms interval between the leading edge of the reference signal VD of step 47 and the leading edge of the inhibit signal TH, so that processing for clearing the light receptors of the image pick-up device is executed.

When the timer in which the time $T_{exp}$ has been set runs out of time, there is a transition again to the interrupt processing of FIG. 4. Since the count in the mode counter is 1 (step 55), the shutter control signal TS decays and the latch of the trailing blind of the shutter is released (step 56). The timer is then set to time $T_4$ and started (step 57), after which the mode counter is incremented (step 54).

When the timer in which the time $T_4$ has been set runs out of time, the program proceeds to step 58 of FIG. 4 since the count in the mode counter is 2, and the inhibit signal TH is lowered to the L level (step 58). The timer is then halted (step 59) and the mode counter is incremented (step 54).

As a result, the count in the mode counter becomes 3, a YES decision is rendered at step 50 in FIG. 3 and all processing ends.

In the above-described embodiment, processing for adding +3 ms or −3 ms is executed in order to shift the point at which the signal TH decays out of the range of 3 ms on either side of the signal VD (steps 39 and 42). In such case, however, it is permissible to arrange it so that the trailing edge of the signal TH is forcibly brought to a point intermediate the signal VD and the next signal VD.

As many apparently widely different embodiments of the present invention can be made without departing from the spirit and scope thereof, it is to be understood that the invention is not limited to the specific embodiments thereof except as defined in the appended claims.

What is claimed is:

1. A still-video camera comprising:
   an electronic image pick-up device for picking up an image of a subject;

a shutter for controlling incidence of the image of the subject upon said electronic image pick-up device;

timing generator means for generating a field-shift signal, which controls read-out of a video signal from said electronic image pick-up device, slightly later than a synchronizing signal related to recording of the video signal being started;

inhibiting means for inhibiting read-out by the field-shift signal while the shutter is open; and controlling means for controlling said inhibiting means in such a manner that inhibiting of read-out by said inhibiting means fails to be canceled in an interval from the synchronizing signal to generation of the field-shift signal.

2. The still-video camera according to claim 1, wherein a point in time is corrected to occur before or after a time period by said controlling means when said point in time for cancellation of read-inhibit calculated by said inhibiting means falls within said time period between occurrence of said synchronizing signal and occurrence of said field-shift signal.

3. The still-video camera according to claim 1, wherein a point in time is corrected to occur before or after a predetermined time period by said controlling means when said point in time for cancellation of read-inhibit calculated by said inhibiting means falls within said predetermined time period on either side of said synchronizing signal.

4. A method for inhibiting read-out of a video signal by a still-video camera, comprising the steps of:

(a) picking up an image of a subject by an electronic image pick-up device;

(b) incidence controlling of said image of said subject upon said electronic image pick-up device by a shutter of the still-video camera;

(c) developing a synchronizing signal related to recording of the video signal being started;

(d) generating a field-shift signal slightly later than said synchronizing signal for controlling read-out of the video signal from said electronic image pick-up device;

(e) inhibiting read-out by said field-shift signal while the shutter is open; and (f) controlling said step (e) in such a manner that inhibiting read-out fails to be canceled in an interval from said synchronizing signal to generation of said field-shift signal.

5. A method according to claim 4, further comprising the step of correcting a point in time to occur before or after a time period by said step (f) when said point in time for cancellation of read-inhibit calculated at said step (e) falls within said time period between occurrence of said synchronizing signal and occurrence of said field-shift signal.

6. A method according to claim 4, further comprising the step of correcting a point in time to occur before or after a predetermined time period by said step (f) when said point in time for cancellation of read-inhibit calculated at said step (e) falls within said predetermined time period on either side of said synchronizing signal.

* * * * *